United States Patent [19]

Hayes et al.

[11] 4,206,538
[45] Jun. 10, 1980

[54] INPLACE GASKET BELLING METHOD AND APPARATUS

[76] Inventors: Fay A. Hayes, 242 NW. 12th Ave., Boca Raton, Fla. 33432; Leonard L. Hayes, 1906 10th Ave., Lewiston, Id. 83501

[21] Appl. No.: 953,592

[22] Filed: Oct. 23, 1978

[51] Int. Cl.² .................... B23P 11/02; B23P 19/02
[52] U.S. Cl. .......................................... 29/450; 29/235
[58] Field of Search ................................. 29/451, 235

[56] References Cited

U.S. PATENT DOCUMENTS

| | | | |
|---|---|---|---|
| 2,962,803 | 12/1960 | Jones | 29/235 X |
| 3,010,194 | 11/1961 | Fratzke | 29/450 X |
| 3,286,332 | 11/1966 | Wilson | 29/450 X |
| 3,520,047 | 7/1970 | Muhlner et al. | 29/450 X |
| 3,887,992 | 6/1975 | Parmann | 29/450 |

Primary Examiner—Charlie T. Moon

Attorney, Agent, or Firm—Zarley, McKee, Thomte, Voorhees & Sease

[57] ABSTRACT

An inplace gasket belling machine for belling one end portion of a plastic pipe and inserting a gasket therein includes a preliminary mandrel and a primary mandrel. The preliminary mandrel has a pipe expanding portion disposed forwardly of a belling sleeve carrying portion whereby upon advancement of the preliminary mandrel, the belling sleeve is carried into the expanded pipe end portion. The primary mandrel has a gasket carrying portion and a gasket positioning sleeve slidable thereon whereby upon retraction of the preliminary mandrel from the belling sleeve and insertion of the primary mandrel therein, a gasket is positioned within the expanded pipe end portion. Upon retraction of the belling sleeve from the pipe end portion and retraction of the gasket positioning sleeve independently of the gasket carrying portion, the pipe end portion is collapsed onto the gasket carrying portion prior to retraction of the primary mandrel from the completed pipe end portion.

15 Claims, 7 Drawing Figures

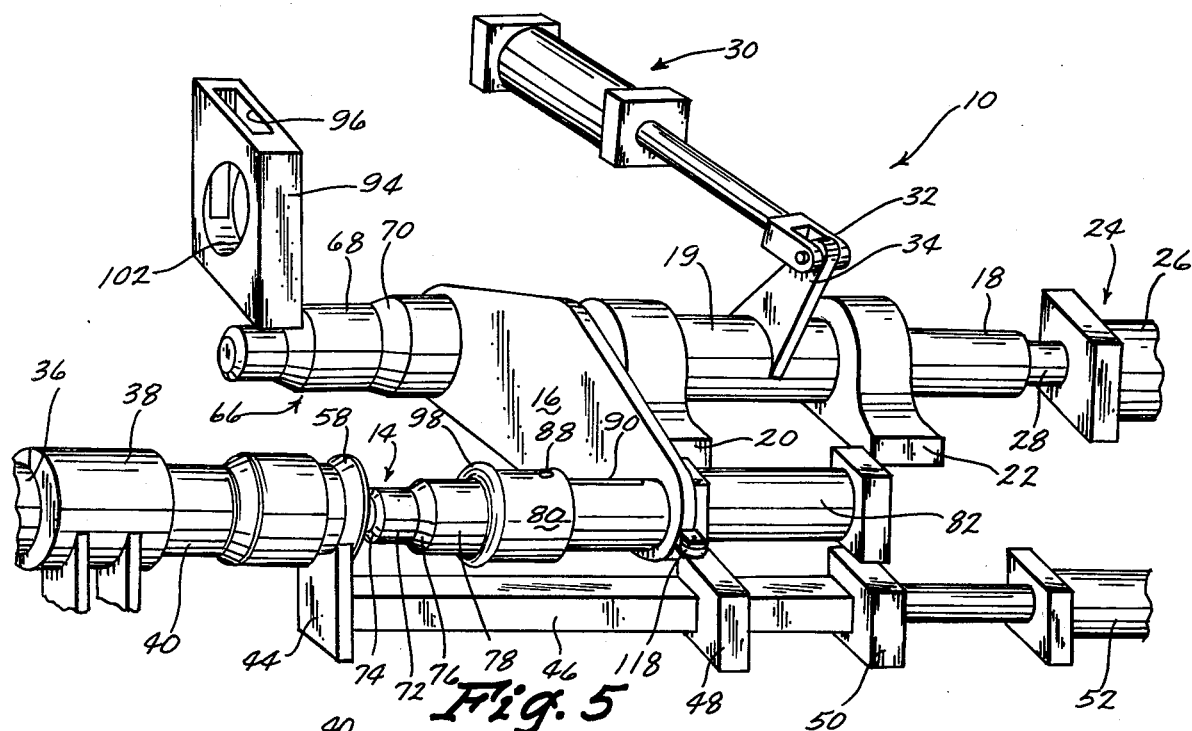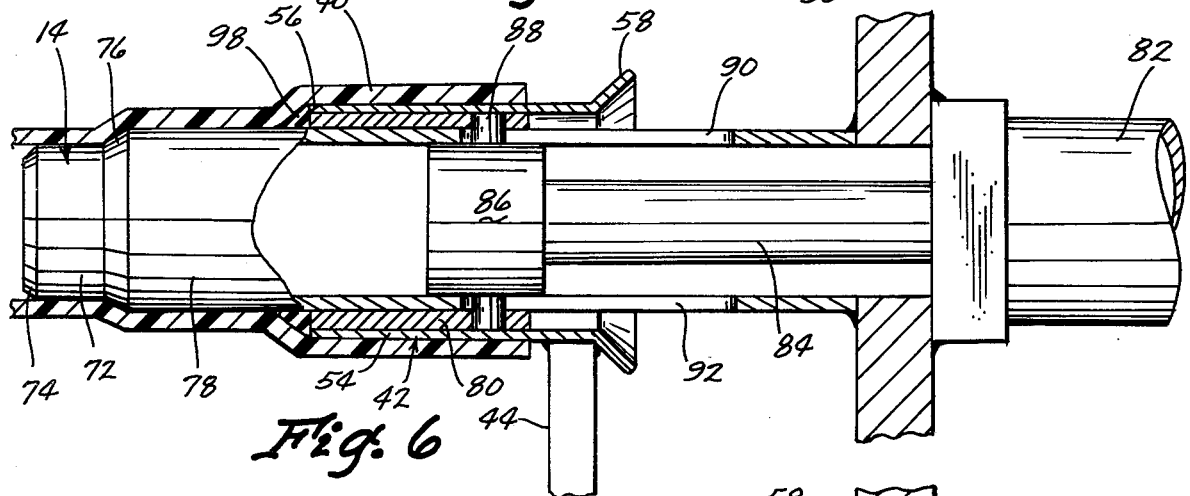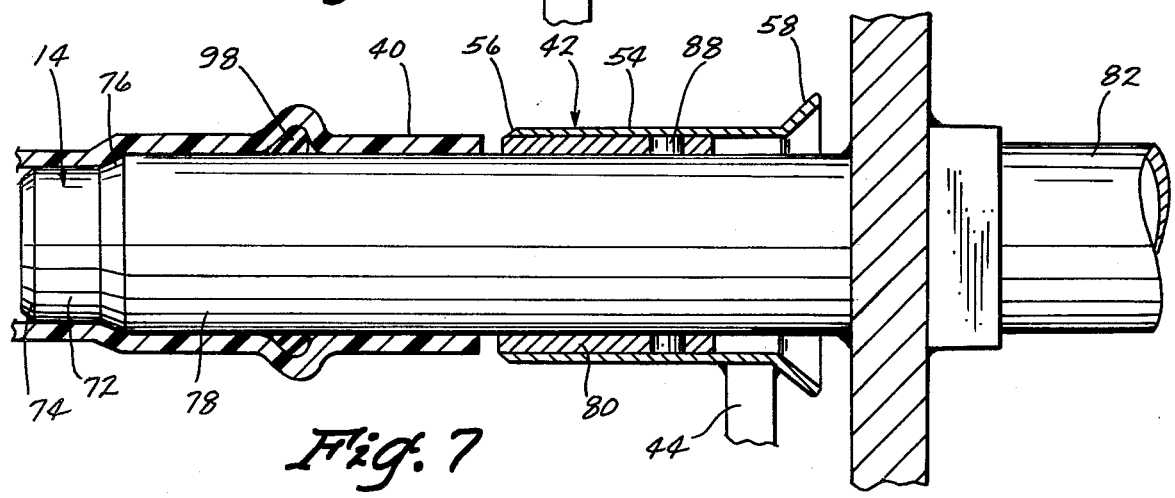

INPLACE GASKET BELLING METHOD AND APPARATUS

BACKGROUND OF THE INVENTION

This invention relates to improvements in an inplace gasket belling machine and more particularly to a pipe belling machine including a pair of mandrels alternately advanced into a pipe end portion for belling the same and inserting a gasket therein. The invention is further directed to an improved method of belling a pipe end portion.

Presently known inplace gasket belling machines are dependent to some extent on the inclined or arcuate cross-sectional shape of the gasket being inserted. The leading tapered or arcuate surface of such gaskets facilitates insertion into the expanded end of the pipe as well as the avoidance of interference as the gasket is moved into the pipe end portion. Interference between the gasket and pipe end portions during insertion of the gasket can result in the collapse of the pipe end portion in the direction of insertion. A gasket having a shape which lacks a tapered or arcuate leading surface is far more susceptible to interference with the pipe when inserted by existing machines. For example, such difficulties are likely to be experienced with gaskets of a square cross-section.

Accordingly, it is a primary object of the present invention to provide an improved inplace gasket belling method and apparatus.

A further object of the present invention is to provide an inplace gasket belling method and apparatus adapted for the insertion of gaskets of any cross-sectional shape.

A further object of the present invention is to provide an inplace gasket belling method and apparatus adapted for the insertion of gaskets having a blunt or substantially vertical leading surface.

A further object of the present invention is to provide an inplace gasket belling method and apparatus wherein a first mandrel expands part of a pipe end portion and inserts a belling sleeve therein and a second mandrel inserts a gasket into the belling sleeve.

A further object of the present invention is to provide an inplace gasket belling machine including a pair of mandrels which are supported for pivotal and axial movement in unison.

Finally, it is an object of the present invention to provide an inplace gasket belling machine which is economical to manufacture, durable in use and efficient in operation.

SUMMARY OF THE INVENTION

The inplace gasket belling machine of the present invention includes preliminary and primary mandrels alternately moveable into alignment with a pipe end portion. The preliminary mandrel has a flared pipe expanding portion and a belling sleeve carrying portion disposed rearwardly thereof for carrying a belling sleeve into an expanded pipe end portion. The primary mandrel has a gasket carrying portion and a gasket positioning sleeve slidable thereon. Upon retraction of the preliminary mandrel from the belling sleeve and insertion of the primary mandrel therein, a gasket engaged by the gasket positioning sleeve is advanced to the desired position within the pipe end portion. Upon retraction of the belling sleeve and gasket positioning sleeve independently of the gasket carrying portion, the pipe end portion collapses onto the gasket and gasket carrying portion. Upon retraction of the primary mandrel from the belling sleeve, the belling of the pipe end portion is complete.

The method of the present invention thus includes the steps of expanding a pipe end portion and inserting a belling sleeve therein, engaging a gasket on a mandrel and advancing the mandrel into the inserted belling sleeve to position the gasket within the expanded pipe end portion. The method further includes retracting the belling sleeve, thereby allowing the expanded pipe end portion to collapse onto the mandrel and retracting the mandrel from the collapsed pipe end portion.

The belling sleeve thus serves as a guide during insertion of a gasket to preclude interference between the gasket and expanded pipe end portion. Accordingly, accidental collapsing of the pipe end portion is prevented. The belling sleeve may be provided with an outwardly flared flange at the rearward end thereof to facilitate the insertion of gaskets of any cross-sectional shape regardless of whether the leading surface of the gasket is inclined or arcuate.

The preliminary and primary mandrels, which are supported for pivotal and axial movement in unison, are thus alternately insertable into a stationary pipe end portion. Furthermore, the mandrels may be so arranged that a gasket is automatically placed on the primary mandrel as the preliminary mandrel is advanced into the pipe end portion.

These and other features and advantages of the invention will become apparent upon reading the following detailed description and upon reference to the drawings.

BRIEF DESCRIPTION OF THE DRAWINGS

FIG. 5 is a perspective view, similar to FIG. 1, with the mandrels pivotally moved to the alternate positions therefor;

FIG. 6 is a side view, partly in section, showing the fully advanced position of the primary mandrel within a pipe end portion; and FIG. 7 is a side view, similar to FIG. 6, with the belling sleeve and gasket positioning sleeve retracted from the pipe end portion.

DESCRIPTION OF THE PREFERRED EMBODIMENT

Figure 1:
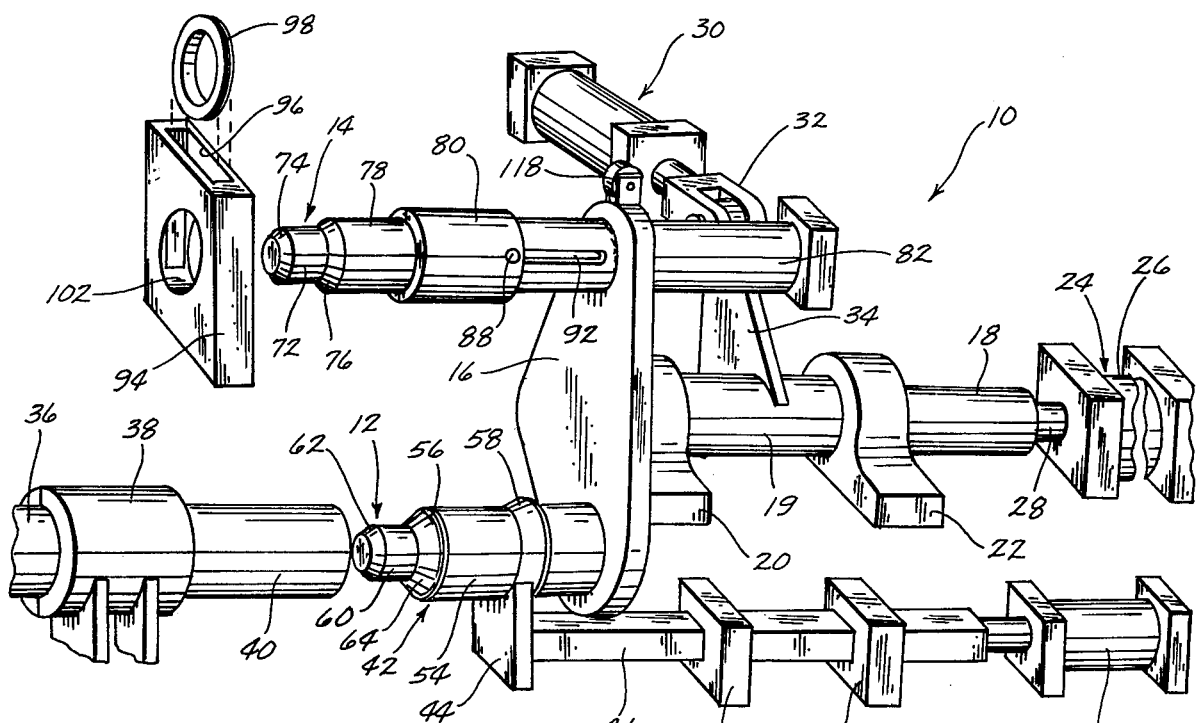
FIG. 1 is a perspective view of the improved portion of a gasket belling machine according to the present invention.

The improvement of this invention for an inplace gasket belling machine is referred to generally at 10 in FIG. 1 and includes a pair of mandrels, a preliminary mandrel 12 and a primary mandrel 14. The mandrels 12 and 14 are secured to a mounting plate or frame 16 in spaced apart relation for pivotal and axial movement in unison.

Mounting plate 16 is secured onto the forward end of a main shaft 18 which is slidably supported within a main shaft support sleeve 19. Sleeve 19 is pivotally supported by a pair of spaced apart bearing blocks 20 and 22. The main shaft 18 is keyed to the support sleeve 19 by any conventional means for pivotal movement therewith while being free to slide axially within the sleeve 19. Axial advancement and retraction of the mandrels 12 and 14, mounting plate 16 and main shaft 18 is accomplished by a double acting hydraulic cylinder unit 24, hereinafter referred to as the mandrel cylinder. The cylinder portion 26 of mandrel cylinder 24 is fixed at a position in alignment with the main shaft 18 and a piston 28 is secured to the rearward end of main shaft 18 for advancing and retracting the main shaft in response to actuation of the mandrel cylinder 24.

Pivotal movement of the mandrels 12 and 14, mounting plate 16 and main shaft 18 is controlled by an extensible and retractable hydraulic cylinder unit 30 having a piston end 32 pivotally connected to a rock arm 34 which is secured to the main shaft support sleeve 19 at a position between the bearing blocks 20 and 22.

A pipe 36 which is to be belled is securely held by a clamping fixture 38 which grasps the pipe at a position forwardly of the pipe end portion 40. Note that the bearing blocks 20 and 22 are to be fixed onto an inplace gasket belling machine at a position such that when the mounting plate 16 is pivoted to the position shown in FIG. 1, the preliminary mandrel 12 is disposed in an aligned position in axial alignment with the pipe end portion 40. Furthermore, the mandrels are so arranged on the mounting plate that when the hydraulic cylinder unit 30 is extended to pivot the mounting plate 16, the primary mandrel 12 is moved to an aligned position, as indicated in FIG. 5, in alignment with the pipe end portion 40.

Also supported in axial alignment with the pipe end portion 40 is a belling sleeve 42. In the preferred embodiment shown, the belling sleeve 42 is fixed on a support plate 44 secured to the forward end of a square section shaft 46 supported with freedom of fore and aft movement by another pair of bearing blocks 48 and 50. A hydraulic cylinder unit 52 has a rearward end secured relative to the gasket belling machine and a forward or piston end secured to shaft 46 for retracting the belling sleeve 42 in response to contraction of the hydraulic cylinder unit 52.

The belling sleeve includes a generally cylindrical portion 54 having a forwardly tapered front edge as at 56 and a rearwardly and outwardly flared flange 58 at the rearward end thereof for purposes described hereinbelow.

Referring to FIG. 1 and 5, the preliminary mandrel 12 has a nose portion 60 with a forwardly tapered edge as at 62. Rearwardly of nose portion 60, there is provided a rearwardly and outwardly flared pipe expanding portion 64 which merges into a belling sleeve carrying portion 66. Portion 66 has a generally cylindrical surface 68 disposed immediately forwardly of a rearwardly and outwardly inclined engagement surface 70. It can be seen in FIG. 1 that when the preliminary mandrel 12 is advanced through the belling sleeve 42, cylindrical portion 54 is telescopically received on the belling sleeve carrying portion 66 and engagement surface 70 coacts with the flange 58 to engage the belling sleeve 42 on the preliminary mandrel 12 for advancing movement therewith.

The primary mandrel 14 also is provided with a nose portion 72 having a tapered forward edge as at 74. Rearwardly of nose portion 72, there is provided a rearwardly and outwardly flared belling portion 76 which merges at its rearward end with a cylindrical gasket carrying surface 78.

Figure 4:
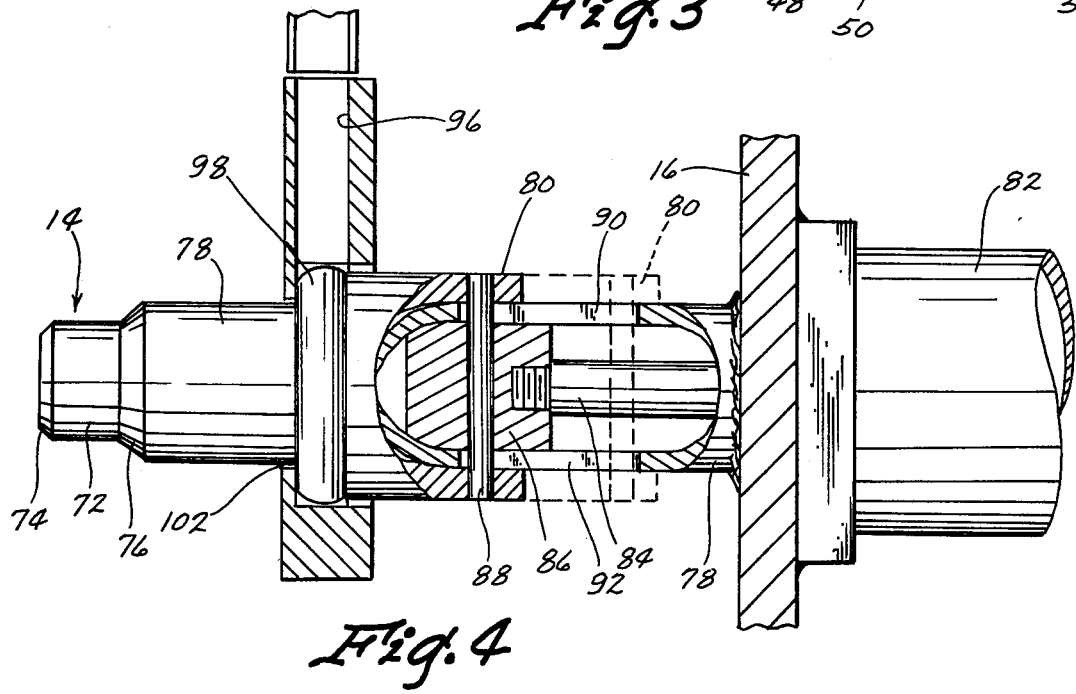
FIG. 4 is an enlarged detail sectional view, taken along line 4—4 in FIG. 3, showing the gasket positioning sleeve on the primary mandrel.

A gasket positioning sleeve 80 (FIG. 1) is slidably supported on the gasket carrying surface 78. A hydraulic cylinder unit 82 is secured on the rearward side of mounting plate 16 for advancing and retracting the gasket positioning sleeve 80 relative to the gasket carrying surface 78. For this purpose, referring to FIG. 4, it can be seen that hydraulic cylinder unit 82 has a piston 84 which extends forwardly through an opening in mounting plate 16 into the center of the generally tubular primary mandrel 14. A piston-like block 86 is threaded onto the forward end of piston 84. The gasket positioning sleeve 80 is keyed to the block 86 by a pin 88 for axial movement therewith relative to the gasket carrying surface 78. Slots 90 and 92 are formed in opposite sides of the primary mandrel to accommodate axial movement of the pin 88 and gasket positioning sleeve 80 between the solid and dotted line positions therefor shown in FIG. 4 in response to actuation of hydraulic cylinder unit 82.

Figure 2:
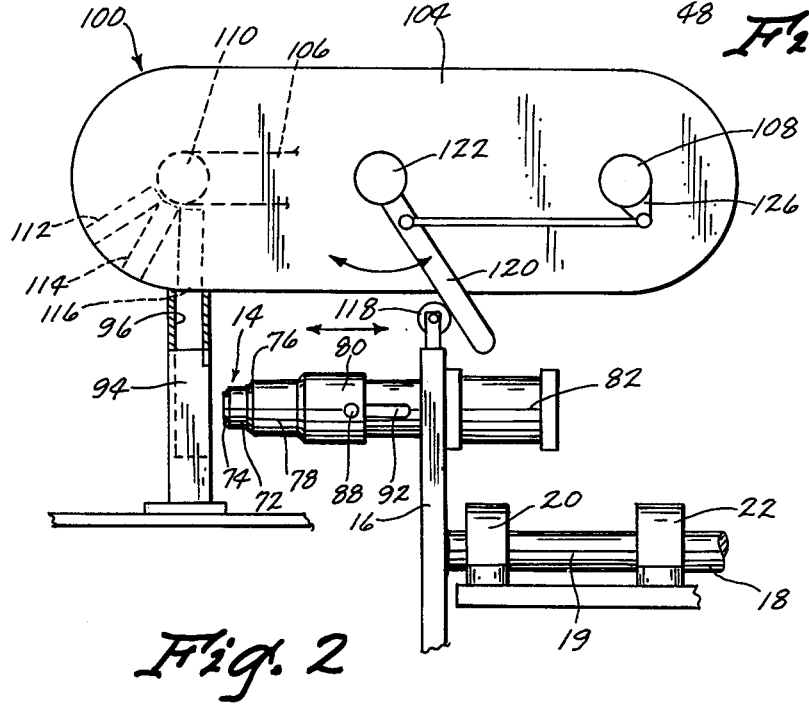
FIG. 2 is a side slevational view showing the automatic operation of the gasket magazine to supply a gasket for the primary mandrel.

To automatically place a gasket onto the gasket carrying surface 78 of the primary mandrel 14, there is provided a gasket holding ring 94 which includes an open topped slot 96 for receiving a gasket 98 from a gasket magazine 100 shown in FIG. 2. Holding ring 94 also has a central opening 102. Note that the gasket positioning sleeve is stationarily supported on the machine at a position such that central opening 102 is disposed in axial alignment with the primary mandrel 14 when the preliminary mandrel 12 is aligned with the pipe end portion 40 as indicated in FIG. 1. Accordingly, as the primary mandrel 14 is advanced through central opening 102, a gasket deposited within the holding ring is received onto the gasket carrying surface 78. The central opening 102 is large enough at the rearward side of ring 94 to permit withdrawal of the gasket 98 therethrough when the primary mandrel is retracted.

The gasket magazine 100 is an elongated generally enclosed housing 104 having a conveyor means 106 trained about a pair of longitudinally spaced-apart rollers 108 and 110. The conveyor means carries a plurality of spaced-apart support members 112 directed perpendicularly to the conveyor means for defining gasket receiving compartments 114 between the support members. Housing 104 has an opening in registration with the open topped gasket holding ring 94 so that when the conveyor means 106 is advanced to register a compartment 114 with the opening 116, a gasket is dispensed from the compartment through the opening by gravity and into the gasket holding ring 94.

Coacting means are provided on the gasket magazine 100 and primary mandrel 14 for automatically advancing the conveyor means 106 by one compartment in response to retracting movement of the primary mandrel as shown in FIG. 2. The coacting means includes a wheel 118 rotatably carried on the edge of mounting plate 16 adjacent the primary mandrel at a position for engagement with a depending lever 120 pivotally supported on the housing 104 at 122. A linkage 124 connects lever 120 to a one way clutch 126 for rotating the roller 108 in response to counterclockwise pivotal movement of lever 120 as seen in FIG. 2.

Figure 3:
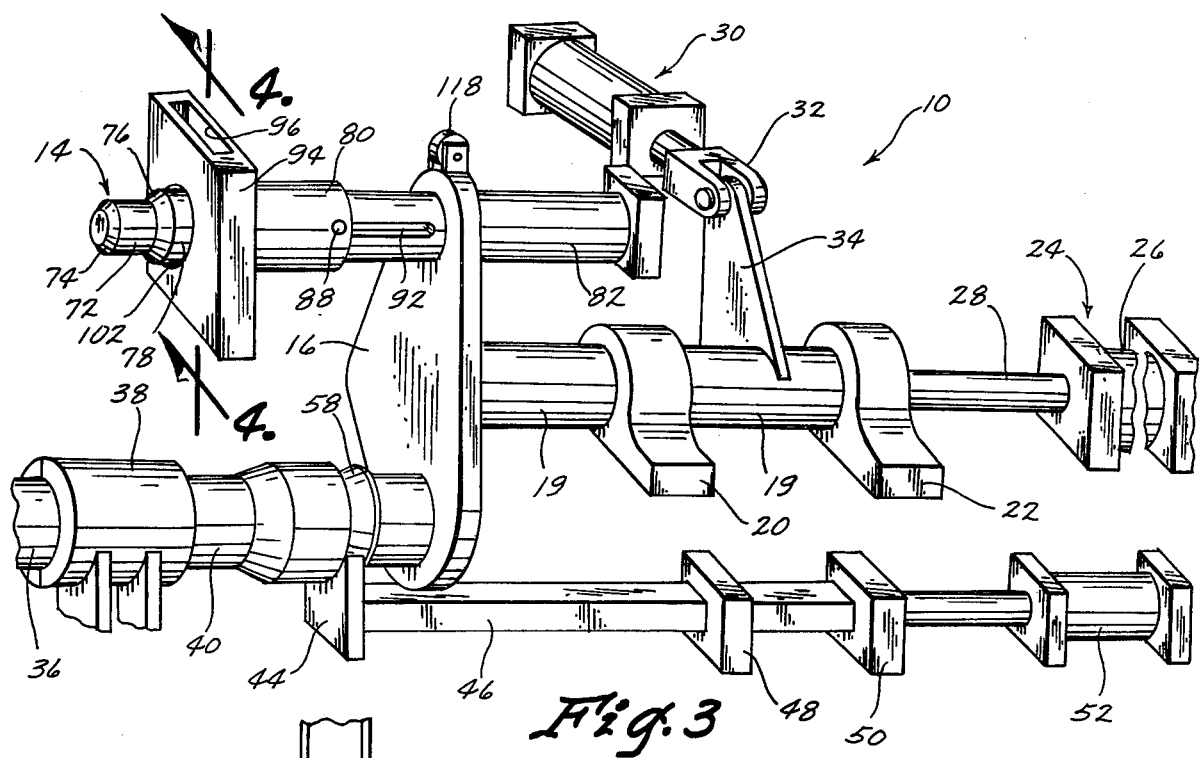
FIG. 3 is a perspective view of the invention, similar to FIG. 1, showing the mandrels in advanced positions.

In operation, the preliminary mandrel 12 is first moved to its aligned position whereupon the mandrel cylinder 24 is extended to advance the preliminary mandrel 12 into and through the belling sleeve 42. Upon engagement of the frustoconical surface 70 with belling sleeve flange 58, the belling sleeve is carried forwardly with the preliminary mandrel. It is to be understood that the pipe end portion 40 is presoftened in a heating process to facilitate expansion. As the pipe expanding portion 64 is advanced into pipe 36, the pipe end portion 40 is radially expanded and the belling sleeve 42 is inserted into the expanded pipe end portion as indicated in FIG. 3.

Simultaneously, the primary mandrel 14 is advanced into and through the gasket holding ring 94 to receive a gasket 98 on the gasket carrying portion 78. Note that at this stage, the gasket positioning sleeve is in the forward solid line position of FIG. 4 and disposed in engagement with a gasket 98 in the holding ring 94.

Upon retraction of the mandrel cylinder 24, the preliminary mandrel 12 is withdrawn from the belling sleeve 42 and the primary mandrel 14 with the gasket 98 thereon is withdrawn from holding ring 94. Hydraulic cylinder unit 30 is then extended to pivot the mounting plate 16 to the position of FIG. 5 wherein the primary mandrel 14 is in its aligned position. Upon extension of the mandrel cylinder 24 once again, the primary mandrel 14 is advanced into the belling sleeve 42.

Referring to FIG. 6, it can be seen that the gasket positioning sleeve 80 is advanced to the extent of insertion of the belling sleeve 42 so that the gasket is moved to a position at the forward end of the belling sleeve. At the same time, belling portion 76 has advanced forwardly of belling sleeve 42 thereby belling or radially expanding the pipe end portion 40 forwardly of the belling sleeve.

Finally, hydraulic cylinder unit 52 is contracted to retract shaft 46 and belling sleeve 42 to a position in clearance relation from the pipe end portion 40. Hydraulic cylinder unit 82 is then contracted to retract the gasket positioning sleeve 80 independently of the primary mandrel 14. The gasket positioning sleeve is retracted to the dotted position shown in FIG. 4 so that it too is disposed in clearance relation from the pipe end portion 40.

The warm pipe end portion then automatically collapses onto the gasket carrying surface 78 of the primary mandrel. After cooling of the collapsed pipe end portion 40 by a water shower means or the like, mandrel cylinder 24 is again retracted to fully retract the primary mandrel 14 from the completed pipe end portion. Upon retraction of hydraulic cylinder unit 30, the mandrels are returned to the positions of FIG. 1 to begin another cycle. Note that a gasket 98 has already been deposited in the gasket holding ring 94 by pivotal movement of lever 120 in response to the initial retraction of the primary cylinder 14 from the gasket holding ring on the previous cycle.

It can be seen in FIG. 6 that the outwardly and rearwardly flared flange 58 on the belling sleeve 42 facilitates the insertion of a gasket of any cross-sectional shape into the belling sleeve. Once a gasket is advanced into the belling sleeve, it is separated from the pipe end portion 40 by the cylindrical portion 54 until it attains its fully inserted position. Accordingly, there is no chance for interference between the gasket and pipe end portion during insertion with the result that the possibility of collapsing the pipe end portion during insertion of the gasket is substantially eliminated.

Accordingly, there has been shown and described an improvement for an inplace gasket belling machine and a method of belling the end portion of a plastic pipe which accomplishes at least all of the stated objects.

I claim:

1. In an inplace gasket belling machine for belling one end portion of a plastic pipe and inserting a gasket therein, the improvement comprising,
   a pair of belling mandrels including a preliminary mandrel and a primary mandrel,
   means for alternately moving said mandrels into aligned positions in alignment with a pipe end portion,
   a belling sleeve,
   means for supporting said belling sleeve in axial alignment with said pipe end portion,
   said preliminary mandrel including an outwardly and rearwardly flared pipe expanding portion and a belling sleeve carrying portion disposed rearwardly thereof,
   means for axially advancing and retracting said mandrels, in the aligned positions therefor, through said belling sleeve and into said pipe end portion,
   said pipe expanding portion being adapted to expand said pipe end portion in response to advancement of the preliminary mandrel whereby the belling sleeve is inserted into said expanded pipe end portion,
   said primary mandrel including a gasket carrying portion and a gasket positioning sleeve slidable on said gasket carrying portion and adapted to engage a gasket carried thereon,
   said gasket positioning sleeve, in response to advancement of the primary mandrel, being adapted to advance a gasket into said belling sleeve,
   means for retracting said belling sleeve from the pipe end portion, and
   means for retracting the gasket positioning sleeve independently of the gasket carrying portion whereby said pipe end portion may collapse onto said gasket carrying portion.

2. The improvement of claim 1 wherein said primary mandrel includes an outwardly and rearwardly flared belling portion disposed forwardly of said gasket carrying portion, said belling portion, in response to advancement of the primary mandrel, being adapted to bell said pipe end portion forwardly of said belling sleeve while said gasket positioning sleeve is advanced into said belling sleeve.

3. The improvement of claim 1 further comprising a mounting frame, said mandrels being secured to said mounting frame in spaced apart relation for movement in unison.

4. The improvement of claim 3 including means for pivotally supporting said mounting frame with freedom of axial movement relative to the pivot axis therefor.

5. The improvement of claim 4 wherein said mandrels and mounting frame are pivotally moveable between first and second positions corresponding to the aligned positions for said preliminary and primary mandrels respectively.

6. The improvement of claim 4 wherein said means for supporting said mounting frame includes a main shaft extended rearwardly therefrom, a main shaft support sleeve, means for keying said main shaft to said support sleeve for pivotal movement therewith and freedom of axial movement relative thereto, and means for pivotally moving said main shaft support sleeve.

7. The improvement of claim 1 further comprising coacting engagement means on said belling sleeve and belling sleeve carrying portion, said coacting means being engaged upon advancement of said preliminary mandrel, in the aligned position therefor, through said belling sleeve and into said pipe end portion whereby said belling sleeve is inserted into said pipe end portion.

8. The improvement of claim 7 wherein said coacting means includes an outwardly and rearwardly flared flange on the rearward end of said belling sleeve and flange engagement means on said belling sleeve carrying portion.

9. The improvement of claim 1 wherein said means for retracting the gasket positioning sleeve comprises a hydraulic cylinder unit carried within said primary mandrel for axial movement therewith.

10. The improvement of claim 1 wherein said means for advancing said primary mandrel, in the aligned position therefor, is adapted to advance the gasket positioning sleeve at least to the extent of insertion of said belling sleeve, whereby a gasket engaged by said gasket positioning sleeve is positioned within said pipe end portion forwardly of said belling sleeve.

11. The improvement of claim 10 further comprising a gasket holding ring adapted to support a gasket in alignment with said primary mandrel when the preliminary mandrel is in the aligned position therefor, whereby said primary mandrel is advanced into the gasket holding ring when the preliminary mandrel is advanced into said pipe end portion.

12. A method or belling one end portion of a plastic pipe and inserting a gasket therein comprising
- radially expanding the pipe end portion,
- inserting a belling sleeve into the expanded pipe end portion,
- providing a mandrel adapted to carry a gasket thereon,
- engaging a gasket on said mandrel,
- advancing said mandrel into the inserted belling sleeve to the extent that said gasket is positioned within said expanded pipe end portion,
- retracting the belling sleeve from said expanded pipe end portion thereby allowing the expanded pipe end portion to collapse onto said mandrel, and
- retracting said mandrel from the collapsed pipe end portion.

13. A method of belling one end portion of a plastic pipe and inserting a gasket therein comprising,
- providing a pair of mandrels including a preliminary mandrel and a primary mandrel having a gasket positioning sleeve movably supported thereon,
- moving said preliminary mandrel into alignment with said pipe end portion,
- engaging a belling sleeve on said preliminary mandrel for axial movement therewith,
- advancing said preliminary mandrel into said pipe end portion, thereby expanding the same and inserting the belling sleeve into the expanded pipe end portion,
- retracting said preliminary mandrel from said pipe end portion and belling sleeve,
- engaging a gasket on said primary mandrel forwardly of said gasket positioning sleeve,
- moving said primary mandrel into alignment with said pipe end portion and belling sleeve,
- advancing said primary mandrel through said belling sleeve to the extent that a gasket engaged thereon is positioned adjacent the forward end of the belling sleeve,
- retracting the belling sleeve from said expanded pipe end portion,
- retracting the gasket positioning sleeve from said pipe end portion independentaly of said gasket carrying portion thereby allowing the expanded pipe end portion to collapse onto said gasket carrying portion, and
- retracting said primary mandrel from said collapsed pipe end portion.

14. The method of claim 13 wherein the steps of moving said mandrels into alignment with said pipe end portion include pivotally moving said mandrels in unison.

15. The method of claim 13 wherein advancing said primary mandrel through said belling sleeve includes belling said pipe end portion forwardly of said belling sleeve.

* * * * *